(12) United States Patent
Maes et al.

(10) Patent No.: US 11,120,217 B2
(45) Date of Patent: Sep. 14, 2021

(54) NATURAL LANGUAGE TRANSLATION-BASED ORCHESTRATION WORKFLOW GENERATION

(71) Applicant: ENTIT SOFTWARE LLC, Sanford, NC (US)

(72) Inventors: Stephane Herman Maes, Sunnyvale, CA (US); Karan Singh Chhina, Sunnyvale, CA (US); Guillaume Dubuc, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 125 days.

(21) Appl. No.: 16/223,291

(22) Filed: Dec. 18, 2018

(65) Prior Publication Data

US 2020/0192975 A1 Jun. 18, 2020

(51) Int. Cl.
*G06F 40/211* (2020.01)
*G06F 9/50* (2006.01)
*H04L 29/08* (2006.01)

(52) U.S. Cl.
CPC .......... *G06F 40/211* (2020.01); *G06F 9/5061* (2013.01); *H04L 67/10* (2013.01)

(58) Field of Classification Search
CPC ..... G06F 9/5061; G06F 9/5072; G06F 40/211
See application file for complete search history.

(56) References Cited

U.S. PATENT DOCUMENTS

| | | | | |
|---|---|---|---|---|
| 10,304,455 | B1 * | 5/2019 | Ulaganathan | G05B 13/027 |
| 10,469,665 | B1 * | 11/2019 | Bell | H04L 67/141 |
| 10,554,817 | B1 * | 2/2020 | Sullivan | H04L 67/34 |
| 2006/0074731 | A1 * | 4/2006 | Green | G06Q 10/0633 |
| | | | | 705/7.27 |
| 2006/0136430 | A1 * | 6/2006 | Kumhyr | G06Q 10/087 |
| 2006/0235691 | A1 * | 10/2006 | Tomasic | G06F 16/243 |
| | | | | 704/257 |
| 2012/0116836 | A1 * | 5/2012 | Flores | G06Q 10/0633 |
| | | | | 705/7.27 |
| 2013/0013370 | A1 * | 1/2013 | Mithal | G06Q 10/06 |
| | | | | 705/7.27 |
| 2013/0111033 | A1 * | 5/2013 | Mao | G06F 9/5072 |
| | | | | 709/226 |
| 2014/0343925 | A1 * | 11/2014 | Mankovich | G06F 40/30 |
| | | | | 704/9 |
| 2015/0294089 | A1 * | 10/2015 | Nichols | G06Q 50/22 |
| | | | | 705/3 |

(Continued)

OTHER PUBLICATIONS

Ayehu; "Ayehu Launches Its Next Generation IT Automation and Orchestration Platform Powered by Artificial Intelligence"; https://ayehu.com/ayehu-launches-next-generation-automation-orchestration-platform-powered-artificial-intelligence/; Sep. 13, 2017; 5 pages.

(Continued)

*Primary Examiner* — Shaun Roberts (57) ABSTRACT

A technique includes receiving, by a computer, data representing a task to be automated in association with a computing environment. The technique includes applying, by the computer, natural language processing to the data to generate a sequence of statements describing operations to be executed to perform the task. The sequence of statements is associated with a predetermined orchestration workflow language.

20 Claims, 7 Drawing Sheets

(56) References Cited

U.S. PATENT DOCUMENTS

| | | | |
|---|---|---|---|
| 2016/0092262 A1* | 3/2016 | Bostick | G06F 9/4881 |
| | | | 718/102 |
| 2016/0127418 A1* | 5/2016 | Maes | H04L 63/20 |
| | | | 726/1 |
| 2016/0162801 A1 | 6/2016 | Ardila et al. | |
| 2016/0162819 A1 | 6/2016 | Hakman et al. | |
| 2017/0076246 A1 | 3/2017 | Volkov et al. | |
| 2017/0220963 A1 | 8/2017 | Canaran et al. | |
| 2017/0286766 A1* | 10/2017 | Castelli | G06F 16/258 |
| 2017/0371628 A1* | 12/2017 | Zhao | G06F 8/315 |
| 2018/0018167 A1 | 1/2018 | Hua | |
| 2018/0113850 A1* | 4/2018 | Suparna | G06F 40/284 |
| 2018/0373952 A1* | 12/2018 | Bui | G06K 9/00456 |
| 2019/0004773 A1* | 1/2019 | Hoberman | G06F 3/04847 |
| 2019/0057686 A1* | 2/2019 | Yong | G10L 15/30 |

OTHER PUBLICATIONS

SiriusIQ; "SiriusIQ delivers seriously intelligent AI on Azure Service Fabric"; https://customers.microsoft.com/en-us/story/siriusiq-delivers-seriously-intelligent-ai-on-azure-service-fabric; Apr. 11, 2018; 14 pages.

Trulioo; Innovations in Identity Blog; "AI Automation: 10-point guide to its impact on KYC"; htttps:/www.trulioo.com/blog/ai-automation-banks/; Nov. 14, 2017; 9 pages.

Luong, Minh-Thang; "Effective Approaches to Attention-based Neural Machine Translation"; https://arxiv.org/pdf/1508.04025.pdf; Sep. 20, 2015; 11 pages.

* cited by examiner

NATURAL LANGUAGE TRANSLATION-BASED ORCHESTRATION WORKFLOW GENERATION

BACKGROUND

An increasingly larger number of business entities and individuals are turning to cloud computing and the services provided through a cloud computing system in order to, as examples, sell goods or services, maintain business records, and provide individuals with access to computing resources, among other cloud-related objectives. Cloud computing provides consumers of the cloud with scalable and pooled computing, storage, and networking capacity as a service or combinations of such services built on the above.

DETAILED DESCRIPTION

Cloud computing provides cloud services for a user's data, software and computation. In this context, a "user" refers to an account holder (a business enterprise, a multi-tenant account, a department of a business enterprise, and so forth) or any particular individual that accesses a particular account. As a more specific example, in accordance with example implementations, a user may be an Information Technology (IT) specialist that is affiliated with a particular account holder.

A cloud service generally refers to a service that allows end recipient computer systems (thin clients, portable computers, smartphones, desktop computers and so forth) to access a pool of hosted computing and/or storage resources (i.e., the cloud resources) and networks over a network (the Internet, for example). In this manner, the host, a cloud service provider, may, as examples, provide Software as a Service (SaaS) by hosting applications; Infrastructure as a Service (IaaS) by hosting equipment (servers, storage components, network components, etc.); or a Platform as a Service (PaaS) by hosting a computing platform (operating system, hardware, storage, etc.).

A cloud service may incur charges on a demand basis, may be managed by a cloud service provider and may be scaled (scaled according to desired storage capacity, processing power, network bandwidth and so forth) by the end user. The cloud service may be a public service (an Internet-based service, for example) that is generally available to all potential users or a limited access private service that is provided over a private network (a business enterprise network, for example) as well as a managed cloud service (e.g., a virtual private cloud service) or a hybrid cloud service (a cloud service that is a combination of the above).

Techniques and systems are described herein for purposes of providing automation workflows, such as information technology (IT) automation workflows to configure or install IT resources; business process automation workflows to set up corresponding business processes; and cloud automation workflows to configure and/or deploy cloud computing system resources.

As a more specific example, a cloud automation workflow may be used for purposes of configuring, reconfiguring, updating, scaling, moving, removing, deploying and provisioning a cloud computer system. More specifically, when a user orders a cloud service, the user may perform various actions related to deploying and configuring software that is associated with the ordered cloud service on the provisioned/instantiated infrastructure. As examples, the user may undertake actions to deploy and configure virtual machines (VMs), middleware, application software, application components, and so forth, on the infrastructure. Moreover, the user may undertake actions to manage the lifecycles of cloud resources that are associated with the ordered cloud service. In this context, managing the lifecycle of a cloud resource refers to managing all aspects of the resource, such as managing the resource's size, the computing platform associated with the resource, the retirement of the cloud resource, and so forth. As more specific examples, a user may perform various actions to migrate a particular resource from one data center to another, scale up or down the capacity/computing power of a particular resource, add a new cloud resource, shutdown a particular cloud resource, and so forth. These tasks may consume considerable amounts of administrative time.

For purposes of performing a particular task or establishing a particular use case, a user may develop a workflow. In general, a workflow refers to a sequence of operations to solve a particular problem or address a particular use case. As a more specific example, the user may develop a cloud orchestration workflow for purposes of resolving a particular problem or addressing a use case that is associated with the management of resources of a cloud computing system. In this context, a cloud orchestration workflow refers to a sequence of operations (decisions, actions, and so forth) to perform a particular task associated with a cloud computing system. In accordance with example implementations, the cloud orchestration workflow may refer to a sequence of cloud automation tasks that may be accomplished without human intervention. As examples, the cloud orchestration workflow may refer to a sequence of operations to perform such tasks as provisioning cloud resources (cloud services, cloud components, virtual machines, applications, servers, cloud storage, and so forth); deploying cloud resources; managing the lifecycle of cloud resources; and so forth.

In accordance with some implementations, a cloud orchestration workflow may be written in a format that is specified by a particular cloud orchestration language (e.g., languages, such as Cloud Slang, Operations Orchestration (OO), If This Then That (IFTTT), and so forth). In accordance with example implementations, a cloud computing system may provide cloud orchestration tools for purposes of developing a particular cloud orchestration workflow, such as tools that are part of an Infrastructure as a Service (IaaS), as an example.

As an example of a particular task that may be addressed with a cloud orchestration workflow, a user may develop a workflow to migrate a virtual machine from one cloud computing system (a first physical data center, for example) to another cloud computing system (a second physical data center, for example). Information technology (IT) personnel may create, analyze and troubleshoot a cloud orchestration workflow to perform the migration. After a workflow for a particular category, or type, of problem or use has been developed, the workflow may be added to a knowledge database, and as such, the workflow may serve as a template from which new cloud orchestration workflows may be developed to address the same or similar problems or use cases.

Reusing a workflow template may not be seamless, however, as creating a cloud orchestration workflow from a template may involve additional input, modifications and troubleshooting by IT personnel to tailor the newly-created cloud orchestration workflow to the particular task or use case. In this manner, decisions may be made regarding which portions of the template workflow to retain, which inputs from the template workflow are to be selected for the new workflow, which outputs from the template are to be retained in the new workflow, and so forth. Additionally, there may be several rounds of debugging to address unexpected issues with the new cloud orchestration workflow. Thus, significant resources may be consumed in developing a new cloud orchestration workflow, even when the workflow uses a template as a starting point.

In accordance with example implementations that are described herein, machine learning, and in particular, machine learning-based natural language processing (called "natural language processing" herein, such as machine learning-based natural language translation and/or machine learning-based natural language generation), is employed to automate the process of creating an automation workflow (e.g., a cloud orchestration workflow) from input data that, in general, describes a particular problem to be solved or use case to be established. Moreover, in general, the input data describes one or multiple "tasks." In this context, the "task" may refer to an objective to solve a particular problem and/or establish a particular use case. For example, for cloud computing technology, a "task" may refer to an objective to solve a particular problem and/or establish a particular use case related to the management of one or multiple cloud resources and/or establishing a particular use case for one or multiple cloud resources. More specifically, in accordance with some implementations, the natural language processing may be performed by a natural language processing engine, which may be uses a natural language processing model, such as a recurrent neural network model.

In accordance with some implementations, the machine the natural language generation engine trains, or develops, the natural learning generation model by observing, or training on, labeled input training data. In this manner, for cloud computing applications, the labeled input training data has corresponding answers in the form of labeled output data that represents corresponding known cloud orchestration workflows. In accordance with example implementations, the labeled output data represents cloud orchestration workflows that are specific to a particular cloud orchestration language and are associated with workflows that have been deemed acceptable for solving the particular use case or establishing the particular use case. The goal of the training is to produce a natural learning processing model, which is trained to produce cloud orchestration workflows that are associated with a specific cloud orchestration language and address the problems or use cases represented by the input data.

The input data (whether used to train the natural language processing model or used by the model after training to produce a corresponding cloud orchestration workflow) may take on many different forms, depending on the particular implementation. For example, in accordance with some implementations, the input data may represent a sequence of steps to solve a particular problem or establish a particular use case. As examples, the input data may be a cloud orchestration workflow described in a format that is specified by a cloud orchestration workflow language or described by a script. The sequence of steps may or may not be sufficient to solve the particular problem or establish the particular use case without further modification by the natural learning generation engine.

In accordance with some implementations, the input data may represent a first cloud orchestration workflow that is associated with a first cloud orchestration workflow language, and the natural language processing engine may convert the first cloud orchestration workflow into a second cloud orchestration workflow that is associated with a second cloud orchestration language (different from the first language). In accordance with some implementations, the input data may represent a cloud orchestration workflow that is associated with a particular cloud orchestration workflow, and the natural language processing engine may further optimize (e.g., optimize in terms of cost, processing time and so forth) the process to produce an output cloud orchestration workflow that is associated with the same cloud orchestration workflow but is optimized relative to the input workflow.

In accordance with example implementations, the "different cloud orchestration language" may refer to a language associated with the same language format but a different version of this format. For example, in accordance with some implementations, the above-described first language may be OO, version 9, whereas the second language may be OO, version 10. In accordance with further example implementations, the "different cloud orchestration language" may refer to a language that is associated with a different format (e.g., associated with the OO language, instead of the IFTTT language).

In accordance with example implementations, the input data may not represent specific steps, but rather, the input data may represent a general intent to solve a particular problem or establish a particular use case. For example, the input data may represent the text stating, "move virtual machine A from datacenter A to datacenter B," without reciting any of the specific steps to accomplish this goal.

Although cloud automation workflows are described herein to illustrate possible implementations, in accordance with further example implementations, natural language generation may be used to automate the process of creating automation workflows other than cloud orchestration workflows. As examples, natural language processing may be used, in according with further example implementations, to automate the process of creating IT automation workflows, business process automation workflows, and so forth. In this manner, for these implementations, input data may represent specific steps or a general intent to solve a particular problem or establish a particular use case associated with IT automation or business process automation. Moreover, the same principles discussed above may be applied here to produce an orchestration workflow that is associated with a specific orchestration language and addresses the problems or use cases that are represented by the input data.

Figure 1A:
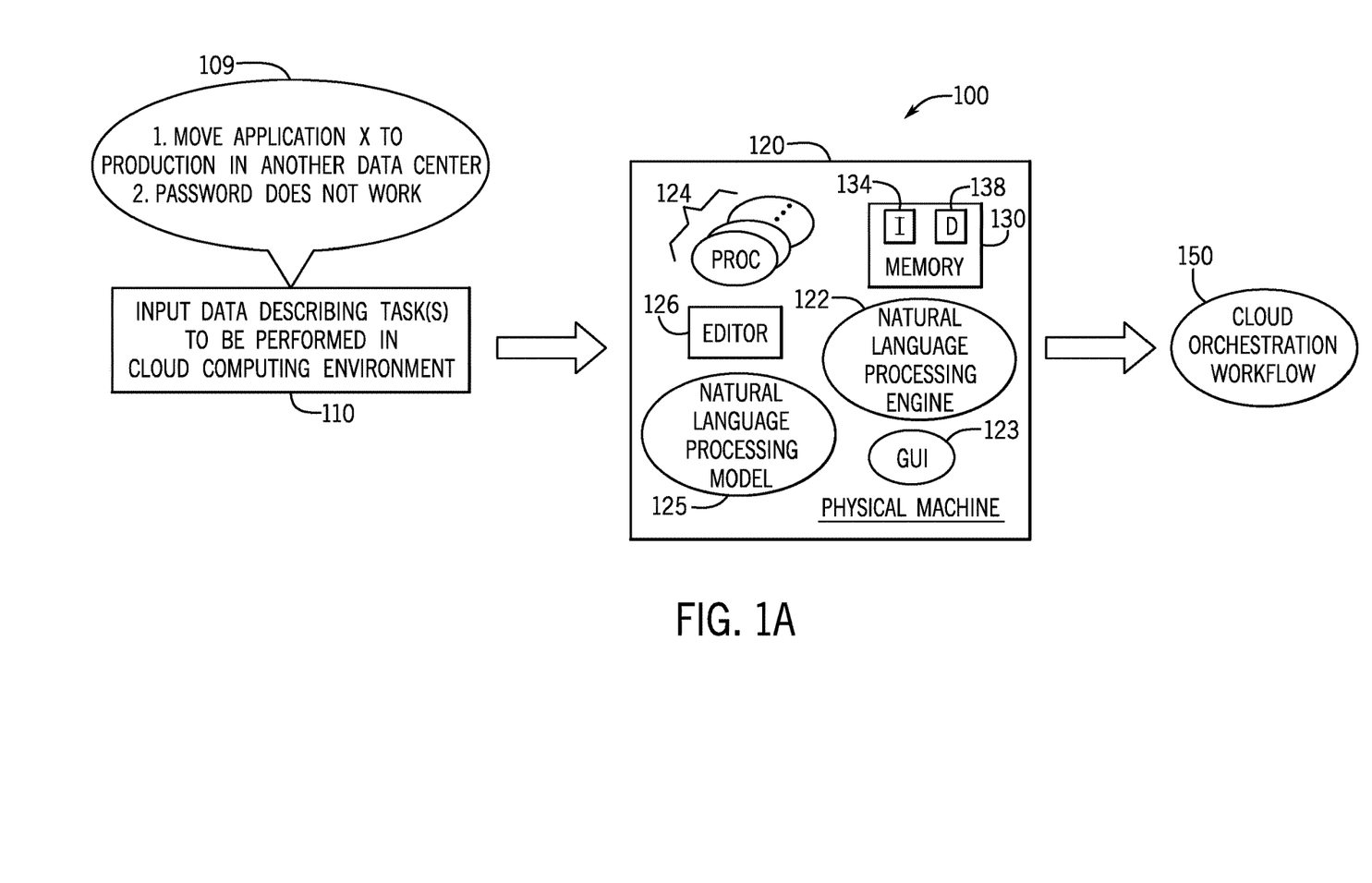
FIG. 1A is a schematic diagram of a computer system to apply natural language processing to convert input data describing cloud computing environment-related tasks or use cases to corresponding cloud orchestration workflows according to an example implementation.

As a more specific example, FIG. 1A depicts a computer system 100 in accordance with some implementations. In general, the computer system 100 includes a physical machine 120, which is constructed to apply machine translation, and more specifically, natural language processing (e.g. machine-based natural language translation and/or machine-based natural language generation), to convert input data 110 that describes a particular problem or use case into a corresponding cloud orchestration workflow 150. The cloud orchestration workflow 150 is associated with a specific cloud orchestration workflow language and sets forth one or multiple operations to solve the problem or establish the use case represented by the input data 110.

The physical machine 120, in accordance with example implementations, is an actual physical machine that is made up of actual hardware and actual machine executable instructions (or "software"). The physical machine 120 may be, as examples, a machine (a tablet, a desktop computer, a portable computer, a smartphone, and so forth) that a particular user of a cloud computing service uses to access the service; a physical machine of a cloud computing system that provides the natural language-based cloud orchestration workflow generation as described herein; and so forth.

The input data 110, in general, may take on numerous forms, depending on the particular implementation. As examples, the input data 110 may represent a cloud orchestration workflow associated with a different cloud orchestration language than the output cloud orchestration workflow 150, a script, or an expression of a user intent for the task(s) to be performed in the cloud computing environment and not associated with a particular workflow language.

The physical machine 120, for the example implementation depicted in FIG. 1A, contains a natural language processing engine 122, which, in response to the input data 110, applies machine translation based on a natural language processing model 125 to produce a corresponding output cloud orchestration workflow 150. In general, the natural language processing engine 122 may train the natural language processing model 125 on labeled input data, which corresponds to known, labeled cloud orchestration workflows (representing the acceptable "answers"). Depending on the particular implementation, the training may refer to training applied before the initial use of the natural language processing engine 122 (and natural language processing model 125), as well as adaptive training (in response to expert review of output cloud orchestration workflows 150), which occurs during the use of the natural language processing engine 122 to produce the cloud orchestration workflows 150.

In accordance with some implementations, the natural language processing engine 122 may produce multiple candidate output cloud orchestration workflows 150 in response to a given set of input data 110. In this manner, the candidate output cloud orchestration workflows 150 may each be associated with a different set of optional ways to establish the use case or perform tasks and accordingly, represents different options for a user to select. Moreover, in accordance with example implementations, the natural language processing engine 122 may use the feedback from the user selection of the candidate output cloud orchestration workflows as labeled training output to further adapt or refine the training of the natural language processing model 125.

In accordance with example implementations, the natural language processing engine 122 may be formed by one or multiple physical hardware processors 124 (one or multiple central processing units (CPUs), one or multiple CPU cores, and so forth) of the physical machine 120 executing machine executable instructions 134 (or "software"). The machine executable instructions 134 may be stored in a memory 130 of the physical machine 120. In general, the memory 130 is a non-transitory memory that may be formed from, as examples, semiconductor storage devices, phase change storage devices, magnetic storage devices, memristor-based devices, a combination of storage devices associated with multiple storage technologies, and so forth.

In accordance with example implementations, in addition to the machine executable instructions 134, the memory 130 may store various data 138 (data describing the input data 110, data representing neurons, or weights, assigned to layers of a natural language processing model 125 used by the natural language processing engine 122, data representing the output cloud orchestration workflows 150, data representing intermediate steps of processes to derive the output cloud orchestration workflows 150, data describing parameters of the natural language processing model 125, data representing user feedback to the provided candidate output cloud orchestration workflows 150, data representing the candidate output cloud orchestration workflows 150, and so forth).

In accordance with some implementations, one or more of the components of the natural language processing engine 122 may be implemented in whole or in part by a hardware circuit that does not include a processor executing machine executable instructions. For example, in accordance with some implementations, one or more parts of the natural language processing engine 122 may be formed in whole or in part by a hardware processor that does not execute machine executable instructions, such as, for example, a hardware processor that is formed from an application specific integrated circuit (ASIC), a field programmable gate array (FPGA), and so forth. Thus, many implementations are contemplated, which are within the scope of the appended claims.

FIG. 1A depicts a specific intent 109 represented by the input data 110, in accordance with example implementations. For this example, the intent 109 represents an automation-related problem, such as a cloud computing-related problem to be solved involving the application of one or multiple tasks. In accordance with further example implementations, the intent 109 may involve another type of computing-related problem, such as a business process-related problem or an IT automation-related problem to be solved involving the application of one or multiple tasks. More specifically, for the example of FIG. 1A, the intent 109 relates to resolving a problem that was encountered in moving a particular application X to production from one data center to another data center. In particular, for this example, the intent 109 represents a desire to fix a problem that occurred due to a password not working when a user attempted to migrate application X.

In response to the input data describing the intent 109, the natural language processing engine 122 may, in accordance with example implementations, construct the corresponding cloud orchestration workflow 150. More specifically, in accordance with example implementations, the natural language processing engine 122 may construct a cloud orchestration workflow 150 that contains one or multiple operations to migrate the application X from the first data center to the target data center. The natural language processing engine 122 may further construct the cloud orchestration workflow 150 to reset the password for a particular user. Moreover, at the conclusion of the generation of the cloud orchestration workflow 150, the physical machine 120 may receive feedback regarding the execution of the cloud orchestration workflow 150 such that the natural language processing model 125 may be further adapted, or refined, for purposes of generating future cloud orchestration workflows.

In accordance with example implementations, the input data 110 may be provided to the natural language processing engine 122 through one of many different input mechanisms, such as a data file or input entered via a graphical user interface (GUI) 123. Moreover, the natural language processing engine 122 may provide its output describing the output cloud orchestration workflow 150, candidate output cloud orchestration workflows 150, and so forth, as an output file, as a graphical output provided via the GUI 123, and so forth.

In accordance with some implementations, the natural language processing engine 122 may, through the GUI 123, provide graphical output representing multiple candidate output cloud orchestration workflows 150, such that one of the candidate workflows 150 may be selected by the user for purposes of using as-is, adapting, improving, customizing, and so forth.

Depending on the particular implementation, the natural language processing model 125 is built and/or trained by aligning intents with specific workflows. The "intents" may be, as an example, intents that are described by sentences, including sentences that more verbosely describes general intents, which are decomposed into more narrowly directed intents. Application of the natural language processing model 125 may be used to generate a new automation workflow for a new intent by translating or natural language generation; and the natural language processing model 125 may be continuously improved at runtime for purposes of continuously improving the developed workflows or automation workflows.

Figure 1B:
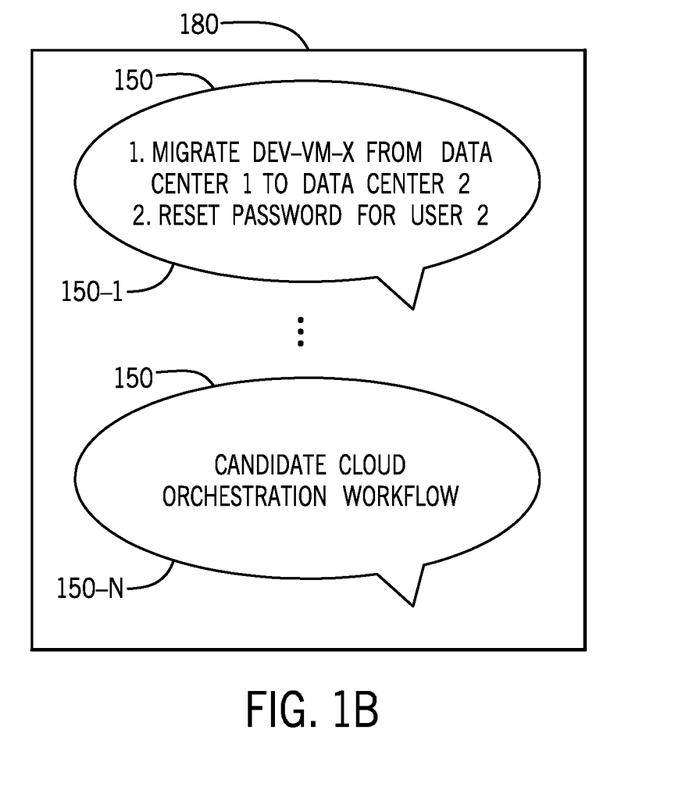
FIG. 1B is an illustration of a graphical output of the computer system of FIG. 1 depicting candidate cloud workflows according to an example implementation.

As a more specific example, referring to FIG. 1B in conjunction with FIG. 1A, in accordance with some implementations, the machine translation engine 120 may provide a graphical output 180 (output provided via the GUI 123, for example), which depicts a list of candidate output cloud orchestration workflows 150 (N candidate output cloud orchestration workflows 150-1, . . . , 150-N, being depicted in FIG. 1B, as examples) for selection by the user. In this manner, the user, through interaction with the GUI 123, such as by interaction through mouse clicks or movements, as examples, may select the particular candidate output cloud orchestration workflow 150. In accordance with example implementations, the user may open the selected candidate cloud orchestration workflow 150 in an editing interface, or editor 126 (see FIG. 1A), for purposes of further refining, or editing, the workflow 150 to produce a final cloud orchestration workflow. In accordance with example implementations, the GUI 123 and the editor 126 may be provided through the execution of machine executable instructions by one or multiple processors 124 of the physical machine 120.

In accordance with example implementations, the natural language processing engine 122 may function as a natural language generation system or as a natural language translator. In this manner, in accordance with example implementations, the natural language processing engine 122 may generate a workflow that is associated with a specific language based on an intent; and in accordance with example implementations, the natural language processing engine 122 may be viewed as a language translator, as the natural language processing engine 122 may, as further described herein, translate intent phrases to corresponding flow phrases. Regardless of whether the natural language processing engine 122 is used as a natural language generation system or a language translator, the training and translation of the natural language processing engine 122 may be based on any of technologies used for purposes of natural language generation and language translation.

The initial training as well as the in use training of the natural language processing engine 122 may be optimized in one or more of the following ways, in accordance with example implementations. First, the natural language processing model 125 may be trained to understand which existing operations to use (e.g., starting from vocabulary dictionary or language model) and what arguments to provide and possibly what arguments to reuse as inputs to operations. Moreover, in its training, the natural language processing model 125 may be trained for purposes of tuning or modifying, the generated cloud orchestration workflows 150 to optimize one or more criteria. In this manner, by analyzing metrics associated with the generated cloud orchestration workflows 150, edits made to the workflows 150 and selected candidate workflow options, in accordance with some implementations, the machine learning engine 122 may adapt to produce future cloud orchestration workflows 150 having less complexities, improved execution times, as well as other optimized criteria. Moreover, in accordance with example implementations, the training of the machine language model 125 may result in the machine learning engine 122 learning how to combine existing workflows, e.g., whether to sequentially combine workflows, how to select workflows for combination, how to combine workflows in parallel, how to call other workflows, how to escape from workflows, and so forth. Moreover, the training of the machine language model 125 may allow the natural language processing engine 122 to adapt to optimally merge or close into a new workflow (e.g., such as insertion of one or multiple workflow parts within another workflow, and so forth).

Thus, the use of the natural language processing engine 122 may have one or multiple advantages, such as eliminating a complete understanding by non-technical personnel, of which existing operations be used to perform a particular task, what arguments to provide and possibly what to reuse as inputs to the operations; how to tune, or modify, the workflow; how to combine existing workflows (e.g., to combine workflows in sequential or parallel use within a workflow or function or escape to another workflow); how to merge workflows into a new workflow (e.g., insertion of one or multiple workflow parts within another workflow); and so forth. Other and different advantages are possible, in accordance with further example implementations.

Figure 2:
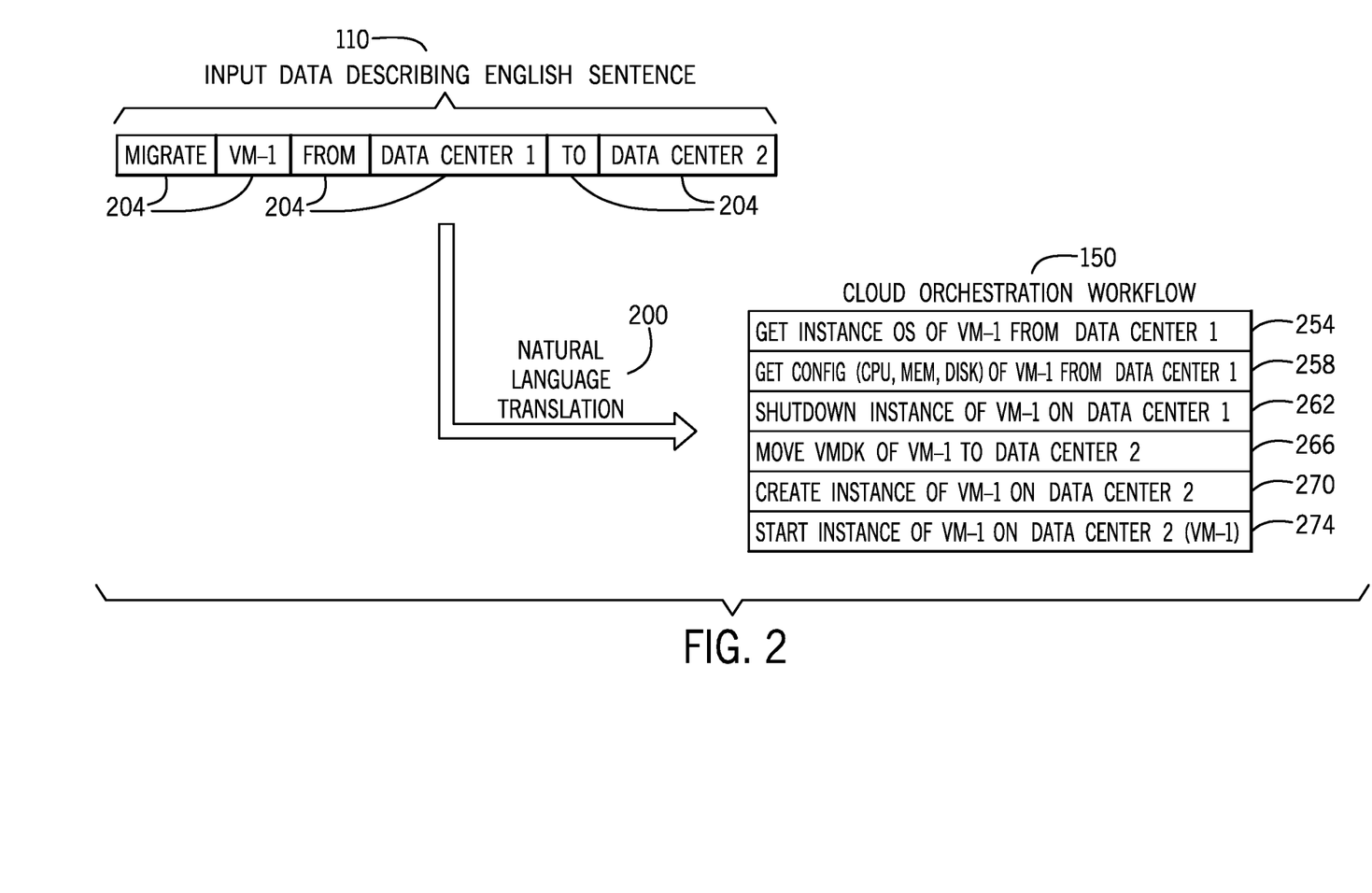
FIG. 2 is an illustration of the natural language translation of text describing an intent to migrate a virtual machine into a corresponding cloud orchestration workflow according to an example implementation.

Referring to FIG. 2 in conjunction with FIG. 1A, as a more specific example, in accordance with some implementations, the natural language processing engine 122 may perform a natural language translation 200 of input data 110 that describes, or represents, an English sentence expressing an intent to migrate a virtual machine (called "VM-1" for this example)) from DataCenter1 to DataCenter2. The natural language processing engine 122 may tokenize text represented by the input data 110. In this manner, in accordance with some implementations, the natural language processing engine 122 may parse text represented by the input data 110 to separate the text into words associated with a particular language construct and then further encode the parsed text into tokens. The encoding may depend on a number of features, such as the parts of speech, the order in which the words appear, and so forth.

As illustrated in FIG. 2, the input sequence 109 for the example depicted in FIG. 1A may be parsed into the following units 204 of text: Migrate; VM-1; from; DataCenter1; to; and DataCenter2. Based on the units 204 of text and other criteria, the natural language processing engine 122 may then encode the units 204 into corresponding tokens and apply the machine translation 220 to these tokens based on the natural language processing model 125 to generate one or multiple cloud orchestration workflows 150.

In accordance with example implementations, the input text may be converted to features vectors in a high dimensional space before being input to the system (e.g., word embedding).

For the example of FIG. 2, the machine translation 200 produces a single output cloud orchestration workflow 150 that includes the following ordered sequence of operations: a first operation 254 to acquire the instance operating system for the virtual machine on DataCenter1; a second operation 258 to acquire the configuration (CPU, memory, disks, and so forth) of the virtual machine on the DataCenter1; an operation 262 to shut down the virtual machine instance on DataCenter1; an operation 266 to move the virtual machine disk from DataCenter1 to DataCenter2; an operation 270 to create an instance of the virtual machine on DataCenter2; and an operation 274 to start the instance of the first machine on the DataCenter2.

In accordance with example implementations, the natural language processing model 125 used by the natural language processing engine 122 may be a neural machine learning model, such as a recurrent neural network (RNN) model. An artificial neural network, in general, may be trained to learn a task without task-specific programming. The neural network is a collection of nodes, called "neurons," and the neurons, in general, are connected such that a given neuron may receive one or multiple signals, process these signals and then signal neurons connected to the given neuron. As an example, the signals received by a particular neuron may be real numbers, and the corresponding output of the given neuron may be a non-linear function of these inputs. The training process for the natural language processing model 125 may assign weights to the neurons of the model 125 such that by applying the non-linear functions and the appropriate weights, the natural language processing model 125 produces output signals representing a sequence of operations, i.e., the cloud orchestration workflow 150.

An RNN model is constructed to allow information to persist within the model 125, which, in turn, allows the model 125 to translate a sequence of words or tokens describing the input sequence to a corresponding output sequence, i.e., the cloud orchestration workflow 150. As such, the RNN, in general, has the ability to connect prior parts of a given input sequence to later parts of the input sequence. As described further herein, in the RNN, neural network units pass information both laterally from unit to unit within the same layer, as well as provide outputs to subsequent layers. For purposes of enhancing this ability, in accordance with some implementations, the RNN model may use neural network units called long short term memory networks (LSTMs), which are capable of learning long term dependencies.

Figure 3:
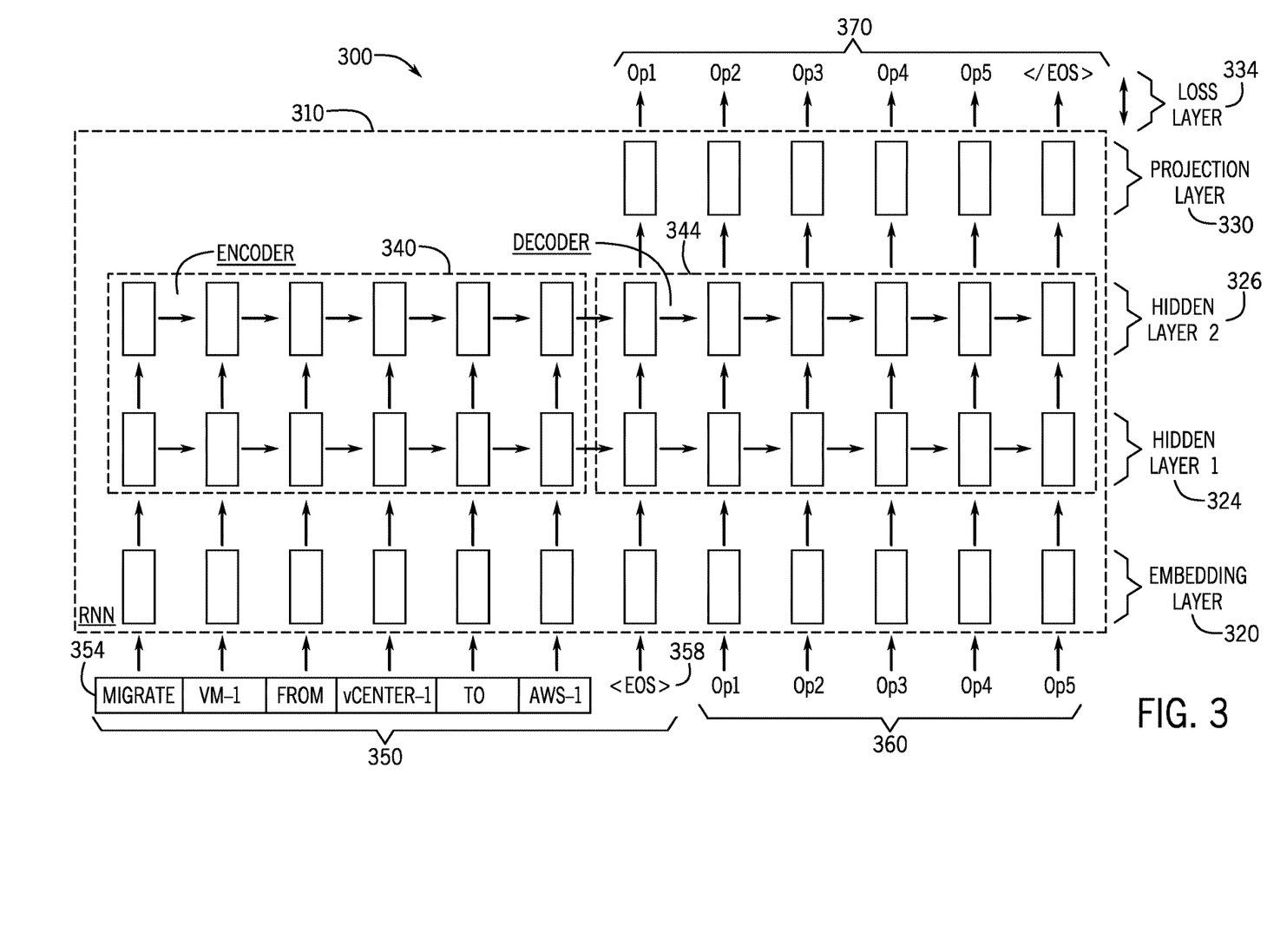
FIG. 3 is a schematic diagram of the natural language processing engine of FIG. 1A illustrating training and use of the engine according to an example implementation.

As a more specific example of the use of an RNN model, FIG. 3 depicts an illustration 300 of the training and use of an RNN 310, in accordance with example implementations. In general, the RNN 310 includes multiple layers of LSTM network units. In particular, the RNN 310 is constructed to be trained with prepared input data, such as tokens that are created from source input words 350 (i.e., tokens derived from the input data 110). Moreover, the RNN 310 may also be constructed to be trained with prepared target input operations 360, i.e., labeled training data. Thus, to train the RNN 310, tokens representing the sequence 350 of input words as well as tokens representing the target input operations 360 may be provided to an embedding layer 320 of the RNN 310.

The embedding layer 320 contains LSTM network units, which converts the words 350 into corresponding dense vectors and provides the corresponding inputs to a first hidden layer 324 of LSTM network units. In accordance with some implementations, the tokenization and encoding may involve converting words (i.e., tokens) into corresponding dense vectors.

The RNN 310 includes multiple hidden layers, such as example hidden layers 324 and 326, which process the dense vectors provided by the embedding layer 320 to provide signals to a projection layer 330 of the recurrent neural network 310. In general, the hidden layers include layers corresponding to a decoder 344 (the portion of the hidden layers corresponding to the hidden state for the target operations 360) and an encoder 340 (the portion of the hidden layers corresponding to the source input words 350). A projection layer 330 converts the hidden state provided by the hidden layers to a vector, which represents a target output workflow 370.

To train the RNN 310, the source input words 350 and target operations 360 are provided to the embedding layer 320, which converts the words 350 into corresponding dense vectors; and the RNN 310 provides a corresponding output cloud orchestration workflow 370, which contains a sequence of operations. As depicted in FIG. 3, the RNN 310 may include a loss layer 334, which allows error calculation, or backpropagation, to be performed for purposes of accessing and correcting for an error between the target output workflow 370 and the target input workflow 360. In use, once trained, the RNN 310 receives source input words and provides a target output workflow based on the weights assigned to the neurons of the RNN 310 during the training period.

Other implementations are contemplated, which are within the scope of the appended claims. For example, in accordance with further example implementations, natural language processing may be employed to translate workflows into corresponding intents or intent descriptions. In this manner, analogous to the techniques and systems that are described herein, in accordance with further example implementations, a natural language processing model may be trained and used to convert workflows into intent descriptions.

Figure 4:
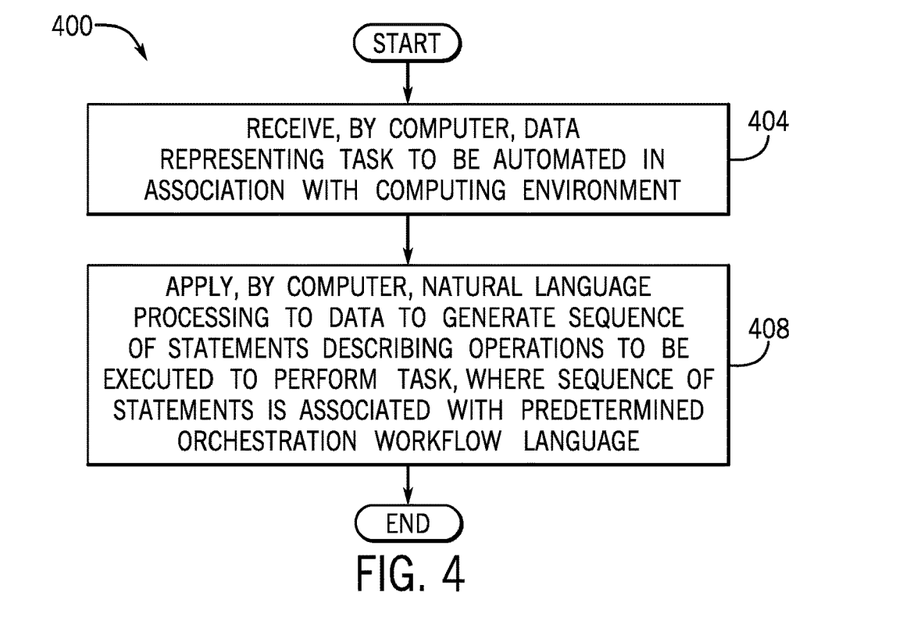
FIG. 4 is a flow diagram depicting a technique to use natural language processing to generate a sequence of statements describing operations to be executed to perform a task associated with a cloud computing environment according to an example implementation.

To summarize the above-described translation-based generation of an automation workflow, referring to FIG. 4, in accordance with example implementations, a technique 400 includes receiving (block 404), by a computer, data representing a task to be automated in association with a computing environment. Pursuant to block 408, the technique 400 includes applying, by the computer, natural language processing to the data to generate a sequence of statements describing operations to be executed to perform the task. The sequence of statements is associated with a predetermined automation workflow language.

Figure 5:
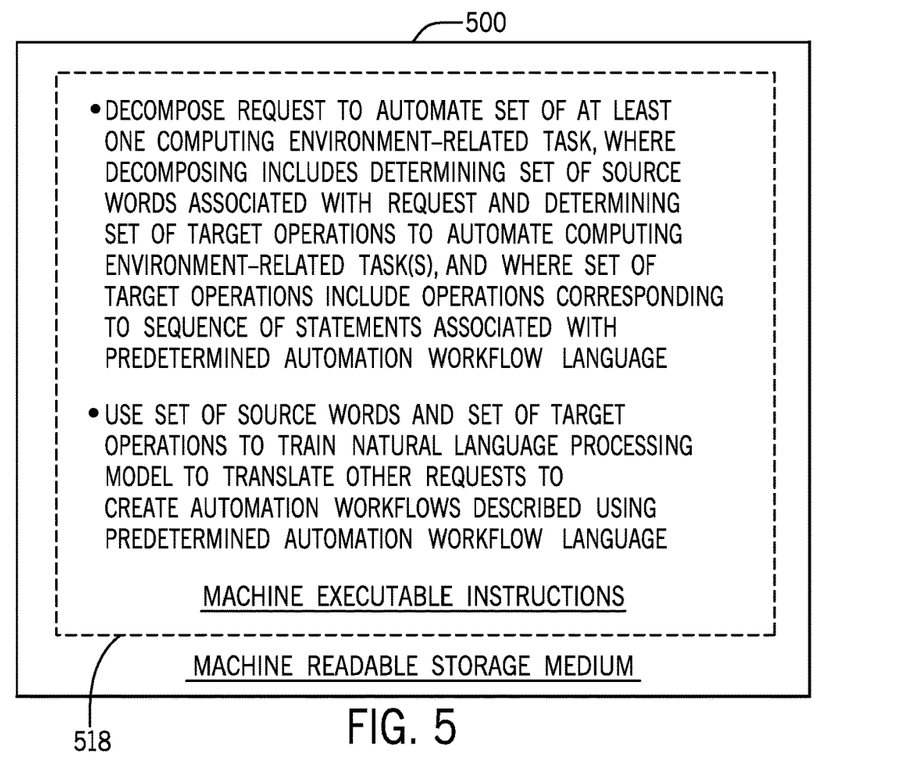
FIG. 5 is an illustration of instructions stored on a non-transitory storage machine that, when executed, cause at least one processor to train a natural language processing model to translate requests to cloud automation workflows according to an example implementation.

It is noted that, depending on the particular implementation, the natural language processing may involve natural language processing or natural language generation; and moreover, the task to be automated may be (as examples) a task to configure and/or deploy resources of a cloud computing environment, a task to repair, configure or deploy resources in connection with an IT automation workflow, a task pertaining to a business automation workflow, and so forth. Thus, in accordance with further example implementations, the systems and techniques that are described herein may further include receiving, by a computer, additional data describing a workflow to automate another task in association with the computing environment; and applying, by the computer, natural language processing to the additional data to generate data representing a description of an intent that is associated with the workflow Referring to FIG. 5, in accordance with example implementations, a non-transitory machine readable storage medium 500 stores machine executable instructions 518 that, when executed by at least one processor, cause the processor(s) to decompose a request to automate a set of at least one computing environment-related task. The decomposition of the request includes determining a set of source words that are associated with the request and determining a set of target operations to automate the computing environment-related task(s). The set of target operations include operations that correspond to a sequence of statements associated with a predetermined cloud automation workflow language. The instructions 518, when executed by the processor(s), cause the processor(s) to use the set of source words and the set of target operations to train a natural language processing model to translate other requests to create automation workflows described using the predetermined automation workflow language.

Figure 6:
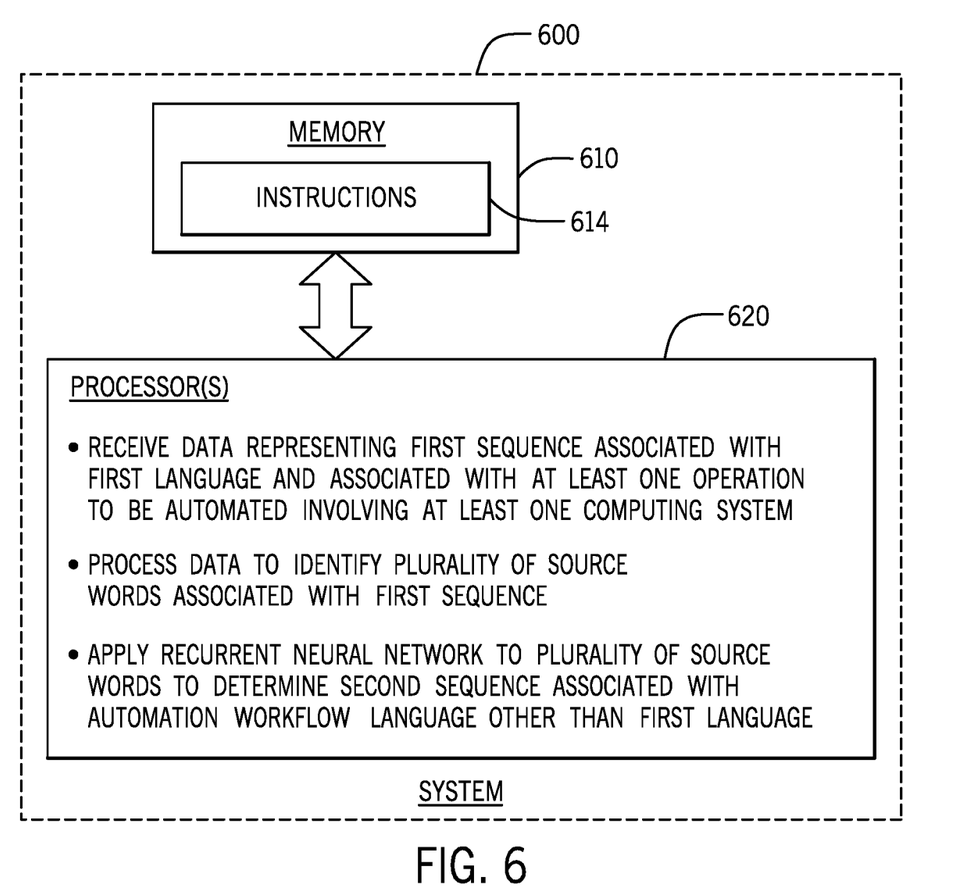
FIG. 6 is a schematic diagram of a system to apply a recurrent neural network to determine a sequence associated with an automation workflow language according to an example implementation.

Referring to FIG. 6, in accordance with example implementations, a system 600 includes at least one processor 620 and a memory 610 to store instructions 614, that, when executed by the processor(s) 620, cause the processor(s) 620 to receive data representing a first sequence that is associated with a first language and associated with at least one operation to be automated involving at least one computing system. The instructions, when executed by the processor(s) 620, cause the processor(s) 620 to process the data to identify a plurality of source words that are associated with the first sequence; and apply a recurrent neural network to the plurality of source words to determine a second sequence that is associated with automation workflow language other than the first language.

As another example of a further implementation, clustering may be used to identify a set of candidate workflows from a given expressed intent. More specifically, in accordance with example implementations, natural language processing may be employed to develop clusters of automation workflows, where each cluster is a group of automation workflows that are associated with a similar intent.

Figure 7A:
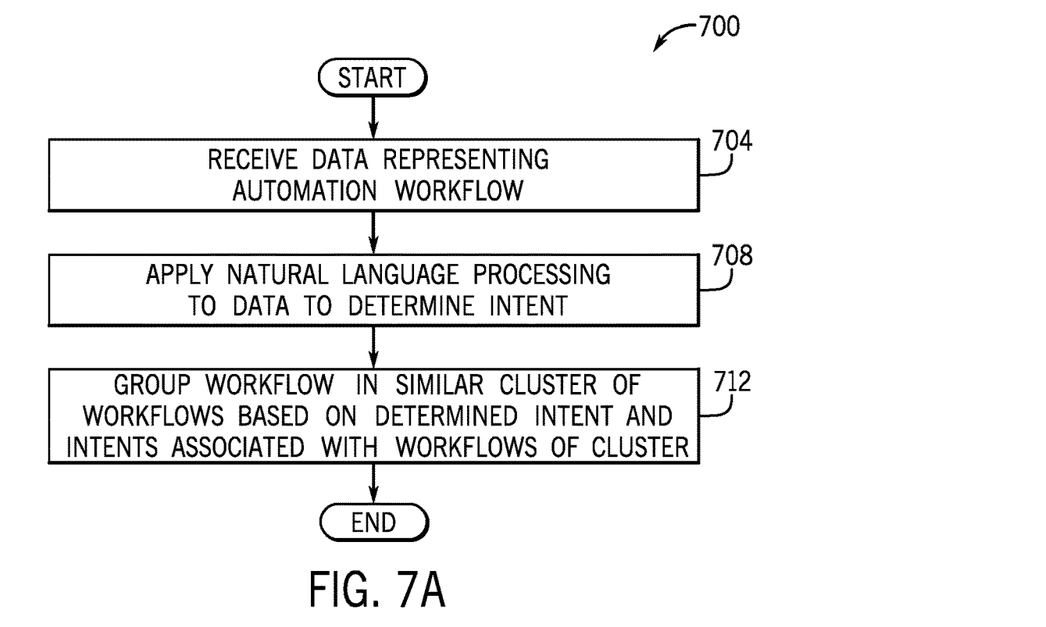
FIG. 7A is a flow diagram depicting a technique to cluster automation workflows based on associated intents according to an example implementation.

More specifically, referring to FIG. 7A in conjunction with FIG. 1A, in accordance with example implementations, the natural language processing engine 122 may receive data (block 704), which represents a particular automation workflow and apply (block 708) natural language processing to the data to generate a corresponding determined intent. The determined intent, in turn, allows the input automation workflow to be "understood" and described in terms of what the workflow may do. Accordingly, pursuant to block 712, the automation workflow may be grouped, or clustered, into a similar cluster of workflows based on the determined intent and the intents that are associated with the workflows of the cluster. For example, in accordance with some implementations, clustering of the automation workflows may be performed by the natural language processing engine 122 by clustering intent sentences by a natural language processing distance (an Euclidean distance, for example). Therefore, this allows clustering of candidate workflows that are similar (in intention) to a given input workflow.

Figure 7B:
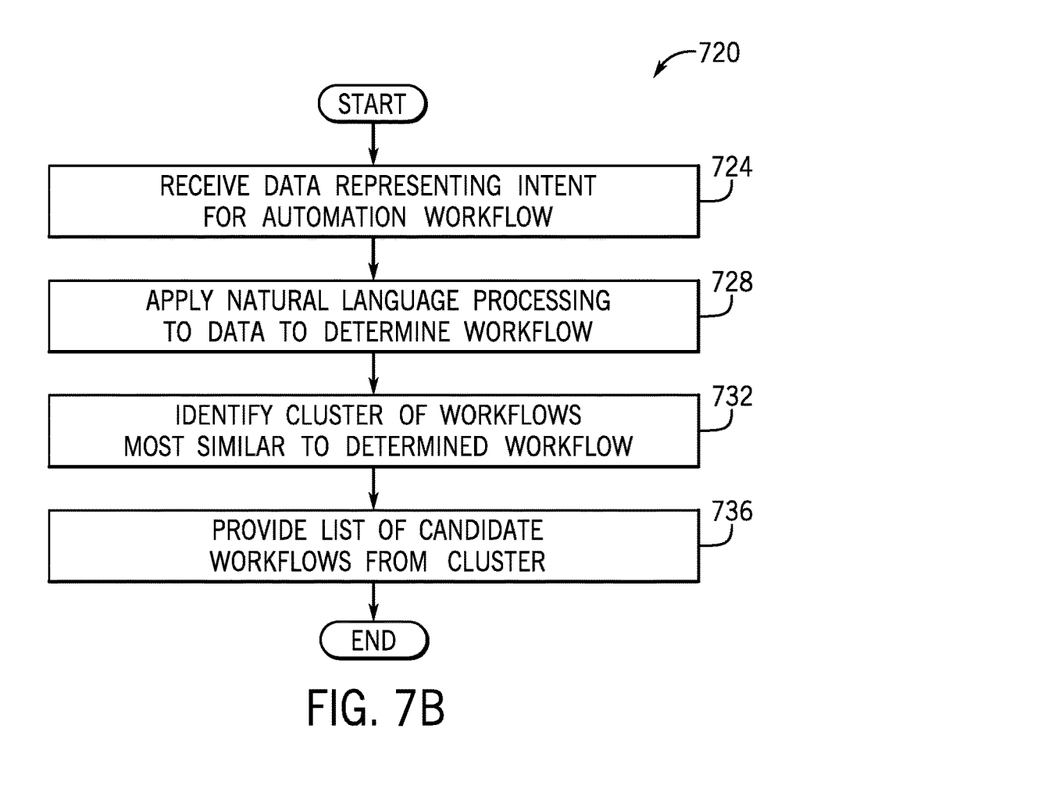
FIG. 7B is a flow diagram depicting a technique to generate a list of candidate automation workflows according to an example implementation.

Moreover, the above-described clustering may be used to provide a set of candidate workflows for a given intent. In this manner, referring to FIG. 7B in conjunction with FIG. 1A, in accordance with example implementations, the natural language processing engine 122 may perform a technique 720 that includes receiving (block 724) data that represents an intent for an automation workflow and applying (block 728) natural language processing to the data to determine a workflow associated with the intent. Pursuant to block 732, a cluster of workflows may then be identified that is most similar to the determined workflow, and from this cluster, a list of candidate workflows may be provided, pursuant to block 736. As an example, in accordance with some implementations, the list of candidate workflows may be a predetermined number N of the closest candidates to the workflow that is determined in block 728.

Among the potential advantage of the above-described clustering and selection of candidate workflows, a user may be provided with a set of tailored candidate workflows, from which the user may select one of the workflows and use the selected workflow as an initial starting point for authoring an automation workflow that corresponds to the expressed intent.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
  receiving, by a computer, data representing a task to be automated in association with a computing environment; and
  applying, by the computer, natural language processing to the data to generate a workflow comprising a sequence of statements describing machine operations to be executed to perform the task to be automated in the computing environment based on a trained model aligning an intent or an intent description comprising intents with each of a plurality of known workflows, wherein applying the natural language processing based on the trained model produces one of the known workflows based on an intent or an intent description comprising intents expressed in the data representing the task to be automated, and wherein the sequence of statements is specified in a predetermined orchestration workflow language.

2. The method of claim 1, wherein applying the natural language processing to the data comprises applying natural language translation to convert the intent or the intent description comprising intents expressed by the data to the sequence of statements in the workflow.

3. The method of claim 1, wherein:
the predetermined orchestration workflow language comprises a second cloud orchestration workflow language; and
applying natural language processing to the data to generate the sequence of statements comprises applying natural language processing to convert another sequence of statements associated with a first cloud orchestration workflow language to the sequence of statements associated with the second cloud orchestration workflow language.

4. The method of claim 3, wherein applying natural language translation comprises optimizing the sequence of statements associated with the first cloud orchestration workflow language based on a predetermined optimization criteria.

5. The method of claim 4, wherein the first cloud orchestration workflow language and the second cloud orchestration workflow language are associated with different versions of the same workflow language.

6. The method of claim 1, wherein:
the data represents a script; and
applying natural language processing to the data comprises applying machine translation to convert the script to the sequence of statements.

7. The method of claim 1, wherein:
the data represents captured text; and
applying natural language processing to the data comprises applying natural language translation to convert the captured text to the sequence of statements.

8. The method of claim 1, wherein applying natural language processing comprises performing neural network-based sequence-to-sequence transformation of a sequence of statements represented by the data to the sequence of statements associated with the predetermined orchestration workflow language.

9. The method of claim 1, further comprising:
receiving, by the computer, additional data describing a workflow to automate another task in association with the computing environment; and
applying, by the computer, natural language processing to the additional data to generate data representing a description of an intent associated with the workflow.

10. The method of claim 1, further comprising displaying a plurality of sequences, including the sequence of statements, as candidate workflows for performing the task.

11. The method of claim 10, further comprising:
using the sequence of statements to identify a cluster of workflows for performing the task; and
identifying the candidate workflows based on an intent-associated distance among the workflows of the cluster of workflows.

12. The method of claim 1, wherein:
the sequence of statements corresponds to an information technology (IT) automation workflow, and the task corresponds to configuring or installing a resources in the computing environment;
the sequence of statements corresponds to a business process automation workflow, and the task corresponds to setting up a business process; or
the sequence of statements corresponds to a cloud automation workflow, and the task corresponds to configuring or deploying a cloud computing system resource.

13. A non-transitory storage medium to store instructions that, when executed by at least one processor, cause the at least one processor to:
decompose a request to automate a set of at least one computing environment-related task, wherein the decomposing comprises determining an intent or a description of an intent to perform an automated task associated with the request and determining, based on the intent or the description of the intent, a set of target operations to automate the at least one computing environment-related task, wherein the set of target operations comprises operations corresponding to a sequence of statements associated with a predetermined cloud automation workflow language; and
use the intent or the description of the intent and the set of target operations to train a natural language generation model aligning intents and intent descriptions with one or more workflows to translate other requests to create automation workflows based on an intent or intent description in the other requests, the created automation workflows described using the predetermined cloud automation workflow language.

14. The storage medium of claim 13, wherein the storage medium stores instructions that, when executed by the at least one processor, cause the at least one processor to form an embedding layer to convert a set of source words into inputs for a plurality of hidden layers of the natural language generation model.

15. The storage medium of claim 13, wherein the storage medium stores instructions that, when executed by the at least one processor, cause the at least one processor to form an embedding layer to convert the set of target operations into inputs for a plurality of hidden layers of the natural language generation model.

16. The storage medium of claim 15, wherein the inputs comprise inputs to decoding portions of the plurality of hidden layers.

17. A system comprising:
at least one processor; and
a memory to store instructions that, when executed by the at least one processor, cause the at least one processor to:
receive data representing a first sequence associated with a first language and associated with at least one operation to be automated involving at least one computing system, wherein the data represents an intent for the first sequence;
process the data to identify a plurality of source words associated with the first sequence; and
apply a recurrent neural network model to the plurality of source words to determine a second sequence based on the intent for the first sequence, the second sequence associated with automation workflow language other than the first language, the recurrent neural network model aligning an intent or an intent description comprising intents with each of a plurality of known workflows, wherein applying the recurrent neural network model produces one of the known workflows based on an intent or an intent description comprising intents expressed in the plurality of source words.

18. The system of claim 17, wherein the memory stores instructions that, when executed by the at least one processor, cause the at least one processor to apply natural language processing by combining a plurality of existing orchestration workflows.

19. The system of claim 17, wherein:
   the second sequence describes a plurality of automation options; and
   the instructions, when executed by the at least one processor, cause the at least one processor to provide an editor to allow editing of the second sequence.

20. The system of claim 17, wherein:
   the instructions, when executed by the at least one processor, cause the at least one processor to apply the recurrent neural network model to extract the intent from the data.

* * * * *